Jan. 26, 1965   R. J. HALLATT   3,166,914
PROCESS OF REFRIGERATION
Filed Dec. 1, 1960   2 Sheets-Sheet 1

Fig.1.

INVENTOR.
Robert J. Hallatt
BY
Andrus & Starke
Attorneys

Jan. 26, 1965 R. J. HALLATT 3,166,914
PROCESS OF REFRIGERATION
Filed Dec. 1, 1960 2 Sheets-Sheet 2

INVENTOR.
Robert J. Hallatt
BY
Andrus & Starke
Attorneys 3,166,914
PROCESS OF REFRIGERATION
Robert J. Hallatt, Tulsa, Okla.; Charles A. Whitebook, executor of said Robert J. Hallatt, deceased, assignor to Robert L. Rorschach, Tulsa, Okla.
Filed Dec. 1, 1960, Ser. No. 72,955
4 Claims. (Cl. 62—101)

This invention relates to a process of refrigeration and more particularly to an absorption refrigeration process having increased efficiency in design to provide low temperature heat removal.

Low temperature refrigeration has particular application in chemical industries, natural gasoline plants and oil refineries where it is desired to recover, separate or purify gases or other materials. For example, ethane and other lighter materials are extracted by low temperature fractionation, and low temperature refrigeration is a most effective low cost method of removing and recovering hydrogen sulfide from gas streams. In addition, low temperature refrigeration is useful in recovery of valuable waste products in oil refineries and in the polymerization of unsaturates in the chemical industry.

In a conventional low temperature absorption refrigeration process employing inert gas, there are two basic areas or functions, the cold end where ultimate refrigeration takes place, and the hot end where the refrigerant is separated from the absorbant. In the cold end the cold refrigerant, which is a low boiling point liquid such as propane, Freon, ammonia and the like, is circulated from a stripper through a chiller or heat exhanger to chill a material passing through the chiller. The warmed refrigerant is then returned to the stripper and a portion of this stream of refrigerant is vaporized as it passes down the stripper in counter current flow to an inert gas. The inert gas is employed in the stripper to effect a reduction in the partial vapor pressure of the refrigerant causing it to boil at a lower temperature with the resulting heat of vaporization capacity for absorbing heat occurring at a lower temperature.

The refrigerant vapor and inert gas then flow through an absorber and counter currently to a cool absorbant liquid. The absorbant serves to absorb the refrigerant vapor to provide an enriched absorbant liquid. The inert gas is recirculated to the stripper while the enriched absorbant flows to a generator or fractionator which is essentially a pressurized tower where the enriched absorbant is volatilized with the differential in volatility between the refrigerant and the absorbant allowing the collection of the refrigerant at the top of the tower and the absorbant at the bottom of the tower. The pure refrigerant is then flowed from the fractionator back to the stripper while the pure or lean absorbant is returned to the absorber.

One of the problems in an inert gas absorption refrigeration system such as this is that the presence of the inert gas in the absorber lessens the ability of the absorbant to absorb refrigerant vapors. Therefore, a greater quantity of absorbant must be circulated through the absorber to dissolve a given amount of refrigerant vapor if inert gas is present, and thus the efficiency of an absorption refrigeration cycle operating at fixed temperature levels is largely a function of the absorbant circulation rate.

The present invention is directed to a low temperature absorption refrigeration system having improved efficiency which is brought about by the use of one or more absorber-exchanger units in the system. According to the invention, the lean or pure absorbant collected in the bottom of the fractionator is passed in heat conductive relation with the pure refrigerant liquid in the absorber-exchanger unit causing the refrigerant liquid to vaporize.

The vapor from the boiling refrigerant contacts the partially enriched absorbant flowing through the unit and as the unit is free of inert gas and as the partially enriched absorbant is at an increased effective absorption pressure, the absorbant is capable of absorbing additional quantities of refrigerant vapor to thereby further enrich the absorbant. Further enriched absorbant may be raised in pressure and this sequence of absorber-exchanger steps is repeated as often as necessary depending upon the temperature range involved and the characteristics of the refrigerant-absorbant combination with the result that as the enriched absorbant moves toward the fractionator it becomes further enriched at each step. Similarly, as the pure separated absorbant is moved progressively from the fractionator to the absorber through each absorber-exchanger unit, its temperature is lowered until it emerges at a low temperature level to be introduced into the absorber section of the absorber-stripper unit. This results in an increased efficiency for it substantially reduces the flow rate of the absorbant which is necessary to absorb the refrigerant vapor in the stripper unit.

The present absorption system eliminates the need for low temperature mechanical refrigeration equipment which is difficult to operate with a high degree of continuity and also lowers the labor cost since operator attendance is not required with the absorption system. Furthermore, the absorption system is capable of using low level waste heat where it is available as a cheap source of energy to operate the system.

The only points of leakage in the system of the invention are the small pumps and the blower used to circulate the inert gas. There is no compressor packing leakage problem which is a common source of difficulty in conventional mechanical refrigeration units. Furthermore, there is very little wear of the equipment for there are few rotating parts and as corrosion is absent, maintenance and component replacement costs are negligible.

The control of the absorption refrigeration system of the invention from the refrigeration load of zero to full capacity is continuous and smooth and not stepwise as in most other systems. Moreover, vibration, a costly and dangerous factor associated with compression-type refrigerator units, is absent in the system of the invention.

The low temperatures can be obtained with the present system with or without cascade or multi-stage systems. For example, the process can easily withdraw heat at —150° F. to reject at atmospheric temperature in one stage.

Other objects and advantages will appear in the course of the following description.

The drawings furnished herewith illustrate the best mode presently contemplated of carrying out the invention.

FIG. 1 is a flow sheet showing the absorption refrigeration system of the invention.

Figure 4:
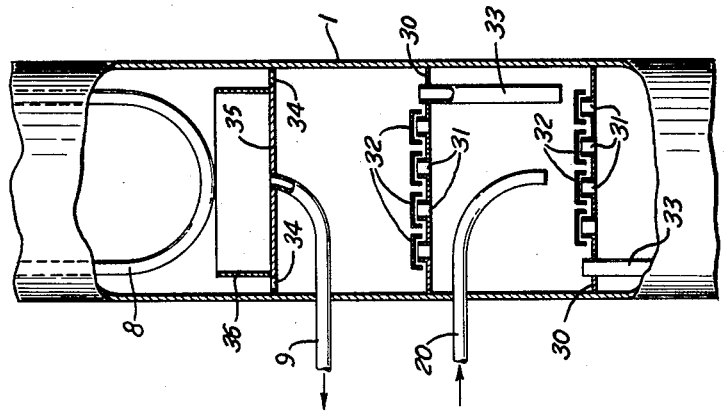
FIG. 4 is an enlarged fragmentary elevation of the fractionator with parts broken away in section.

The drawings illustrate an absorption refrigeration system and include generally a fractionator or generator 1, a stripper-absorber unit 2, and a pair of absorber-exchanger units 3 and 4.

The fractionator 1 is of conventional design and is essentially a pressurized tower where the enriched absorbant is heated to volatilize and separate the refrigerant vapor from the absorbant. The refrigerant to be used in the system may be any low boiling point liquid such as methane, ethane, propane, Freon, ammonia and the like which is capable of being absorbed in the liquid absorbant. The absorbant may take the form of hexane, pentane, water and the like.

The heat exchanged enriched absorbant is introduced into the central portion of the fractionator through line 5 and flashes, the liquid passing downwardly within the fractionator in counter current flow with the vapor moving upwardly within the tower. The bottom liquid is heated by circulating all or part of the liquid through line 6 in contact with a heat source 7. Reboiling of the fractionator can be done in any convenient manner such as direct gas-fired heating, steam, electric heating and the like. Heating of the bottom liquid causes the refrigerant to volatilize and the refrigerant vapor passes upwardly within the fractionator and into contact with a tube bundle 8 containing a cooling medium to thereby condense the refrigerant vapor. A portion of the condensed refrigerant is collected and withdrawn from the fractionator through line 9 while a second portion of the condensed refrigerant flows downwardly within the fractionator which is thus refluxed. The pure absorbant is collected in the bottom of the fractionator.

As shown in FIG. 4, the fractionator 1 includes a series of spaced, horizontal trays 30 which extend across the fractionator, and each tray has a plurality of openings 31 covered by bubble caps 32. The refrigerant vapor passes upwardly within the fractionator through the openings 31 in the trays, while the liquid passes downwardly in countercurrent flow to the vapor and is conducted downwardly from tray to tray by downcomers 33 which are secured to each tray.

The refrigerant vapor passes upwardly from the uppermost tray 30 through openings 34 in a plate 35 which is secured across the fractionator. The refrigerant vapor contacts the cooling medium flowing within the tubes of the tube bundle 8 and condenses. A portion of the condensed refrigerant is collected within a reservoir or container 36 which is supported on plate 35, while a second portion of the condensed refrigerant passes downwardly through the plate 35 and is refluxed again. The condensed refrigerant collected within container 36 is withdrawn from the fractionator through line 9.

The pure absorbant is withdrawn from the fractionator through line 10 and is subsequently introduced into the absorber section 11 of the absorber-stripper unit 2, while the pure refrigerant withdrawn through line 9 is subsequently introduced into the lower stripper portion 12 of the absorber-stripper unit.

A portion of the refrigerant liquid is evaporated in contact with an inert gas in the stripper 12 and the cold liquid refrigerant is withdrawn from the lower end of the stripper and is circulated through line 13 into heat exchanging relation with a fluid to be chilled flowing through line 14. A pump 15 is located in the line 13 and serves to circulate the refrigerant through the line 13. Thus, heat from the fluid in line 14 is transferred to the cold liquid refrigerant to warm the same and the warmed liquid refrigerant is then reintroduced into the upper portion of the stripper.

In order to reduce the partial vapor pressure of the refrigerant within the stripper 12 and to cause the refrigerant to boil at a lower temperature, an inert gas such as helium, hydrogen, nitrogen or the like is circulated through the stripper-absorber unit 2. A line 16 connects the stripper with the upper portion of the absorber unit and the inert gas is circulated by means of blower 17. In this construction the inert gas is introduced into the lower portion of the stripper and passes upwardly through the unit 2 and is withdrawn from the upper portion of the absorber. The absorber-stripper tower 2 operates at substantially atmospheric pressure or slightly above and the inert gas serves to reduce the partial vapor pressure of the refrigerant, causing it to boil at a lower temperature with the resulting heat of vaporization capacity for absorbing heat occurring at a lower temperature. This, of course, results in the liquid refrigerant being withdrawn from the bottom of the stripper being at a lower temperature.

The lean or pure absorbant from the fractionator 1 is introduced in the upper portion of the absorber unit 11 through line 18 and flows downwardly within the absorber in counter current flow to the inert gas and the refrigerant vapor. The absorbant absorbs the refrigerant vapor and the enriched absorbant is discharged from the lower portion of the absorber unit through line 19.

Figure 3:
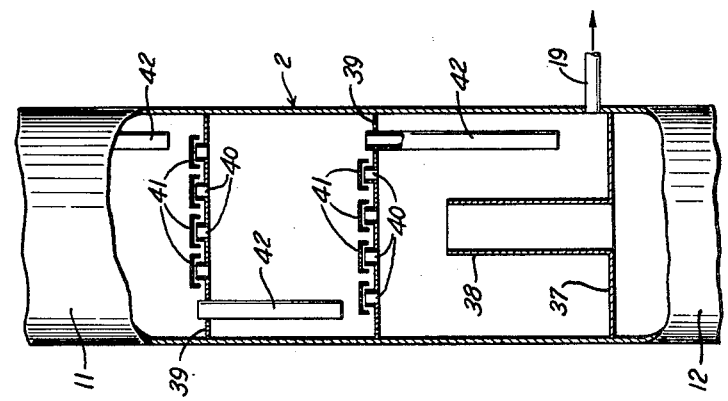
FIG. 3 is an enlarged fragmentary elevation of the absorber-stripper unit with parts broken away in section.

The absorber stripper unit is of conventional design and is shown in more detail in FIG. 3. A plate 37 separates the absorber unit 11 from the stripper unit 12 and a central stand pipe 38 is secured to the plate 37 and the refrigerant vapor passes upwardly through the pipe 38 into the absorber unit 11.

The absorber 11 includes a series of spaced, horizontal trays 39 having a plurality of openings 40 covered by bubble caps 41. The refrigerant vapor passes upwardly through the openings 40 in the trays 39 in contact with the absorbant liquid passing downwardly through the absorber. The liquid absorbant is conducted downwardly from tray to tray by downcomers 42 which are secured to each tray. The absorbant liquid is collected on the upper surface of the plate 37 and is withdrawn from the absorber through line 19. The stripper 12 also includes a series of trays and downcomers similar to those of the absorber 11.

The inert gas being withdrawn from the absorber through line 16 contains some absorbant and refrigerant as contaminants and thus there is a tendency for a small portion of absorbant to accumulate in the refrigerant liquid at the bottom of the stripper. In order to prevent the accumulation of absorbant, a portion of the warmed refrigerant is recirculated back to the fractionator 1 through line 20 and pure refrigerant liquid from the fractionator is introduced into the line 13 through line 21.

It has been found that the presence of the inert gas in the absorber unit lessens the capacity of the pure absorbant entering through line 18 to absorb the refrigerant vapors and thus an increased flow rate of absorbant is necessary in order to dissolve a given amount of refrigerant vapor if the inert gas is present. As the efficiency of the absorption refrigeration cycle operating at fixed temperature levels is largely a function of absorbant circulation rate, the present invention incorporates a series of absorber-exchanger units 3 and 4 which serve to cool the pure absorbant before the same enters the absorber to thereby increase the amount of refrigerant that can be absorbed in the absorbant so that a more efficient system is obtained.

The pure absorbant being withdrawn from the fractionator through line 10 initially passes through a heat exchanger 22 in heat conductive relation to the enriched absorbant in line 5 to thereby cool the pure absorbant and heat the enriched absorbant. After passing through the heat exchanger 22 the pure absorbant may pass through a second heat exchanger 23 where additional heat is lost to a fluid being circulated within lines 24. After leaving the heat exchanger 23 the pure absorbant in line 10 is then introduced into the absorber-exchanger 3 where the pure absorbant is passed in heat conductive relation with the pure refrigerant liquid which is introduced into the central portion of the unit 3 through line 9. As shown in the flow sheet, each absorber-exchanger unit is composed of a tube bundle at the bottom of the tower through which the pure absorbant flows. The pure refrigerant liquid boils around the tube bundle thereby cooling the absorbant in the tubes at a temperature dependent upon the total pressure of the tower. There is no inert gas present in the absorber-exchanger units. The vapor from the boiling refrigerant rises up the tower where it encounters the partially enriched absorbant liquid which is introduced into the upper end of the unit through line 25. The refrigerant vapor is absorbed in the partially enriched absorbant to further enrich the same, and the enriched absorbant is collected from the bottom tray of the absorber-exchanger and pumped through line 5 by pump 26 to the fractionator 1.

The pure absorbant which has been cooled within the absorber-exchanger 3 is then conducted through line 27 to the second absorber-exchanger 4 where it again passes in heat conductive relation with the pure refrigerant liquid which is introduced into the absorber-exchanger 4 from absorber-exchanger 3 through line 28. The unit 4 is substantially similar in construction to unit 3 and the pure absorbant flows through the tube bundle and the pure refrigerant boils around the tubes thereby further cooling the absorbant and vaporizing the refrigerant which rises up the tower into contact with the partially enriched absorbant introduced into the upper end of the unit 4 through line 19. As the unit 4 contains no inert gas, the absorbant is capable of absorbing increased quantities of the refrigerant vapor to further enrich the absorbant, and the further enriched absorbant is conducted by line 25 to the upper end of the absorber-exchanger unit 3. Pump 29 is located in the line 25 to circulate the partially enriched absorbant therein.

The pure refrigerant liquid is withdrawn from the unit 4 through line 21 and is introduced with the warm refrigerant passing within line 13 into the stripper unit 12.

Figure 2:
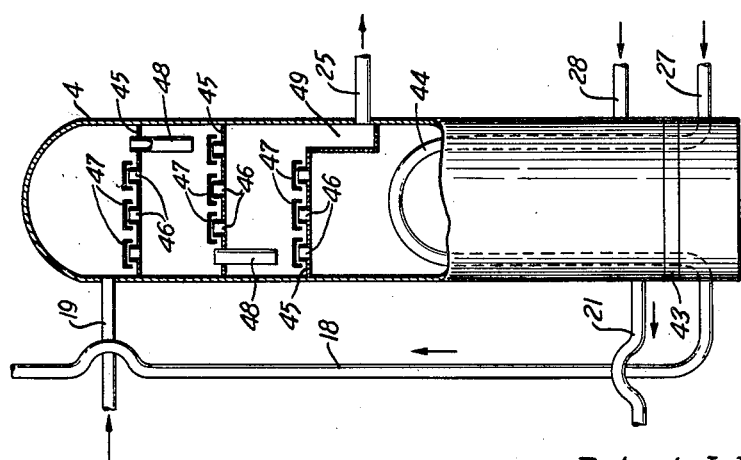
FIG. 2 is an enlarged fragmentary elevation of an absorber-exchanger unit with parts broken away in section.

The absorber-exchangers 3 and 4 are of substantially similar construction and the details of the structure of the absorber-exchanger 4 are shown in FIG. 2. Lines 27 and 18, through which the pure absorbant is conducted, are connected to a header 43 at the lower end of the unit 4. A tube bundle 44 is located in the lower end of the unit 4 and consists of a series of generally U-shaped tubes which are connected to the header 43. The pure absorbant enters the header 43 through line 27, passes through the tube bundle 44 and is discharged from the header through line 18.

A series of trays 45 are secured in vertically spaced relation in the upper portion of the unit 4 and each tray is provided with a plurality of openings 46 which are covered by bubble caps 47. As previously described, the refrigerant boils around the tube bundle 44 and is vaporized. The refrigerant vapor passes upwardly through the openings 46 in contact with the enriched absorbant flowing downwardly from tray to tray through downcomers 48 to thereby further enrich the absorbant. The enriched absorbant is collected in a sump or well 49 associated with the lowermost tray 45 and is withdrawn from the unit through line 25 which communicates with the sump 49. While the heat exchange apparatus in unit 4 which is employed to transfer heat from the absorbant to the refrigerant is shown as a tube bundle 44, it is contemplated that any other type of heat exchange device may be employed. Similarly, while the liquid contact apparatus is shown as a series of bubble cap trays, again it is contemplated that any other type of liquid contact apparatus may be employed whereby the refrigerant will be absorbed within the enriched absorbant.

With this system, as the partially enriched absorbant liquid leaves the absorber 11 through line 19, it moves toward the fractionator 1 through successive absorber-exchangers and becomes further enriched in refrigerant at each step due to the fact that the absorber-exchangers do not contain inert gas and due to the result of increasing pressures. This also results in increasing the temperature of the enriched absorbant at each step.

The pure separated absorbant leaving the fractionator is fed progressively through each absorber-exchanger unit toward the cold end and at each successive step its temperature is lowered until it emerges at a low temperature level to be introduced into the absorber section 11 of the cold absorber-stripper 2. Similarly, the pure refrigerant moving from the fractionator 1 to the cold end at the absorber-stripper 2 has its temperature progressively lowered.

By further enriching the partially enriched absorbant in the absorber-exchanger units and by lowering the temperature of the pure absorbant passing to the absorber, a substantially increased efficiency is obtained for the absorption refrigeration system. In this system, the inert gas is confined to the absorber-stripper unit 2 which permits the attainment of minimum temperatures. However, the inert gas is not present in the absorber-exchanger units 3 and 4 so that the partially enriched absorbant operating at higher effective absorption pressures can absorb increased amounts of the refrigerant vapor. The presence of inert gas lowers the capacity of the absorbant to absorb refrigerant vapor by 5 to 20 times or more and thus, by eliminating the inert gas from the absorber-exchanger units, substantially greater quantities of refrigerant vapor can be absorbed in the absorbant.

Furthermore, the absorber-exchangers serve to lower the temperatures of both the pure refrigerant and the pure absorbant prior to the entry of each into the absorber-stripper unit, and the use of the absorber-exchangers permits the utilization of increased pressures to increase the efficiency of the absorbant to absorb the refrigerant vapors.

The reduction of the vapor pressure in the stripper 12 by the use of the inert gas circulation permits the use of high boiling point refrigerants for low level cooling, such as isobutane, for refrigeration at temperatures of $-50°$ F. These materials are easily condensed at elevated temperatures making air-cooled equipment practical. The system of the invention can attain extremely low temperatures with or without the cascade or multi-stage systems.

The absorption system of the invention has increased efficiency and has definite advantages over the mechanical refrigeration system. The absorption system is uncomplicated and is readily adaptable to conventional instrument control. Vibration, which is a costly and dangerous factor associated with compression-type units, is absent; and similarly, the problem of effectively lubricating low temperature machinery is also eliminated in the present absorption system.

While the above description is directed to the use of two absorber-exchanger units, any number can be employed depending on the ultimate temperatures desired and the characteristics of the absorbant and refrigerant. Similarly, each absorber-exchanger can be composed of separate heating, exchanging and absorbing sections rather than being combined units as described, and the stripper-absorber 2 can also be composed of separate absorber and stripper sections rather than being a single unit.

Various modes of carrying out the invention are contemplated as being within the scope of the following claims particularly pointing out and distinctly claiming the subject matter which is regarded as the invention.

I claim:

1. An absorption process comprising the steps of thermally decomposing a refrigerant-enriched absorbent at the hot end of the system to form a pure absorbent and a refrigerant gas, condensing the refrigerant gas to a liquid, passing the refrigerant liquid in thermal contact with the pure absorbent in a heat exchanger to thereby cool the absorbent and evaporate a portion of the refrigerant liquid, absorbing the refrigerant vapor formed in the last-named step in partially enriched absorbent passing from the cold end of the system to the hot end to further enrich the absorbent, introducing the refrigerant liquid into an evaporator to evaporate a portion of the liquid refrigerant and thereby cool the remaining liquid refrigerant, contacting said remaining liquid refrigerant with a medium to be chilled to thereby warm said remaining liquid refrigerant and chill said medium, passing the refrigerant vapor from the evaporator into contact with pure absorbent to absorb the refrigerant vapor in said pure absorbent to provide said partially enriched absorbent, returning the partially enriched absorbent to the hot end, returning the warmed liquid refrigerant to said hot end, and returning a second portion of the warmed liquid refrigerant to said evaporator.

2. An absorption process comprising the steps of thermally decomposing a refrigerant-enriched absorbent at the hot end of the system to form a pure absorbent and a refrigerant gas, condensing the refrigerant gas to a liquid, passing the refrigerant liquid in thermal contact with the pure absorbent in a heat exchanger to thereby cool the absorbent and evaporate a portion of the refrigerant liquid, absorbing the refrigerant vapor formed in the last-named step in partially enriched absorbent passing from the cold end of the system to the hot end to further enrich the absorbent, passing the liquid refrigerant from the heat exchanger with inert gas to an evaporator to evaporate a portion of the liquid refrigerant and thereby cool the remaining liquid refrigerant, contacting said remaining liquid refrigerant with a medium to be chilled to thereby warm said remaining liquid refrigerant and chill said medium, passing the refrigerant vapor and inert gas from the evaporator to an absorber and into contact with pure absorbent to absorb the refrigerant vapor from the inert gas and provide partially enriched absorbent, recycling the inert gas from the absorber to the evaporator, returning the enriched absorbent from the absorber to the hot end, and returning said warmed liquid refrigerant from the absorber to the hot end.

3. An absorption refrigeration process comprising the steps of thermally decomposing a refrigerant-enriched absorbent in a fractionator to form a pure absorbent and a refrigerant gas, condensing the refrigerant gas to a liquid, passing the refrigerant liquid to a first heat exchanger into thermal contact with pure absorbent from the fractionator to thereby cool the absorbent and evaporate a portion of the refrigerant liquid, passing refrigerant liquid from the first heat exchanger to a second heat exchanger, passing pure absorbent from the first heat exchanger to said second heat exchanger in heat exchange contact with the liquid refrigerant to vaporize a second portion of the liquid refrigerant, passing liquid refrigerant from the second heat exchanger to an evaporator to evaporate a portion of the liquid refrigerant to thereby cool the remaining liquid refrigerant, contacting said remaining liquid refrigerant with a medium to be chilled, introducing pure absorbent from the second heat exchanger to an absorber, passing the refrigerant vapor from said evaporator to the absorber to absorb the refrigerant vapor in said absorbent and provide a partially enriched absorbent, returning the enriched absorbent to the fractionator, returning said remaining liquid refrigerant from the evaporator to the said fractionator, and passing the refrigerant vapor from both the first and second heat exchangers into contact with the partially enriched absorbent flowing to the fractionator to absorb said refrigerant vapor in said partially enriched absorbent and further enrich the same.

4. An absorber-exchanger unit for use in an absorption system having a hot section wherein enriched absorbent is heated to volatize and separate refrigerant from the absorbent and having a cold section where an ultimate chilling of an outside medium by cold refrigerant liquid occurs, comprising an outer casing, heat exchanging means located within the outer casing, first conduit means connected to said casing for supplying refrigerant liquid from the hot section to said heat exchange means, second conduit means connected to said casing for supplying pure absorbent from the hot section to the heat exchange means to thereby evaporate a portion of the refrigerant liquid, third conduit means connected to said casing for conducting enriched absorbent flowing from the cold section to the casing, absorber means located in the casing for absorbing refrigerant vapor in the enriched absorbent passing through said casing to thereby further enrich said absorbent, fourth conduit means connected to said casing for withdrawing the pure absorbent from the heat exchange means, fifth conduit means connected to said casing for conducting the liquid refrigerant from the heat exchange means to the cold section, and sixth conduit means connected to said casing for conducting the further enriched absorbent from the absorber means to the hot section.

References Cited in the file of this patent
UNITED STATES PATENTS

| 2,507,624 | Edel | May 16, 1950 |
| 2,650,480 | Gilmore | Sept. 1, 1953 |